(12) United States Patent
Perkins et al.

(10) Patent No.: US 12,411,911 B1
(45) Date of Patent: Sep. 9, 2025

(54) ENTITY SEGMENTATION BY EVENT RATE OPTIMIZATION

(71) Applicant: INTUIT INC., Mountain View, CA (US)

(72) Inventors: Raymond Perkins, Philadelphia, PA (US); Steven Yeh, New York, NY (US); Atanu Roy, Dublin, CA (US); Brendan McIntyre, Brooklyn, NY (US); Shubham Sah, Dublin, CA (US); Chenyu Shi, Fremont, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/224,096

(22) Filed: May 30, 2025

(51) Int. Cl.
*G06F 16/00* (2019.01)
*G06F 9/50* (2006.01)
*G06F 18/241* (2023.01)

(52) U.S. Cl.
CPC .......... *G06F 18/241* (2023.01); *G06F 9/5027* (2013.01)

(58) Field of Classification Search
CPC ............... G06F 16/907; G06F 16/9535; G06F 18/2321; G06F 18/2178; G06F 18/2433; G06F 18/23; G06F 18/2415; G06F 18/241; G06F 18/214; G06F 18/213; G06F 18/217; G06F 18/2148; G06V 10/762; G06N 5/01; G06N 3/04; G06N 3/08; G06N 20/00; G06N 5/04; G06N 3/006; G06N 7/01; G06N 20/10; G06N 20/20; H04L 63/1441
See application file for complete search history.

(56) References Cited

U.S. PATENT DOCUMENTS

| | | | |
|---|---|---|---|
| 2019/0019109 A1* | 1/2019 | Sadaghiani | G06N 5/01 |
| 2021/0224687 A1* | 7/2021 | Goldszmidt | G06F 18/2415 |
| 2022/0004887 A1* | 1/2022 | Spratt | H04B 1/02 |
| 2025/0086241 A1* | 3/2025 | Runer | G06F 16/907 |
| 2025/0200353 A1* | 6/2025 | Rotstein | G06N 3/0475 |

\* cited by examiner

*Primary Examiner* — Yicun Wu
(74) *Attorney, Agent, or Firm* — Patterson + Sheridan, LLP

(57) ABSTRACT

Aspects of the present disclosure relate to machine learning-based techniques for segmenting entity populations. Embodiments include approximating distributions for outputs generated by a classification machine learning model and ground truth occurrences of a targeted event. A first distribution may relate to the distribution of classification model scores that indicate the likelihood of the targeted event occurring with respect to entities. A second distribution may relate to the distribution of actual occurrences of the targeted event. Based on the distributions, thresholds may be generated by minimizing the values of the thresholds as a function of the distributions and a targeted rate of occurrence for the targeted entity with respect to different segments that are included within the thresholds. Entities may then be segmented based on the thresholds, and interventions (such as resource allocations) may be applied based on the segmentation.

20 Claims, 7 Drawing Sheets

ENTITY SEGMENTATION BY EVENT RATE OPTIMIZATION

INTRODUCTION

Aspects of the present disclosure relate to machine learning-based techniques for segmenting populations of entities. In particular, techniques described herein involve a process for using a machine learning model to generate thresholds that are used to categorize entities. Resources may then be allocated and interventions may be performed based on the categorizations.

BACKGROUND

Real-time data analysis plays a critical role in the functioning of modern computing technologies. As an example, to optimize the performance of computing systems such as networks, software applications, and operating systems, resources may be allocated differently for different tasks based on real-time analysis of data associated with the tasks. For instance, if the data shows that a particular task or software component is causing a relatively large amount of latency compared to other tasks/components, additional processor/network resources may be allocated for performing the task or executing the component. As another example, user profile data may be used to perform interventions such as allocating additional resources based on the actions of the users.

To assist in such real-time data analysis and intervention/resource allocation, population segmentation techniques may be used to categorize entities such as user profiles and computing components. Techniques are known in the art for segmenting entity populations into categories. However, there are several technical and practical challenges associated with these existing techniques. For example, existing segmentation protocols, such as mixed integer programming (MIP) models, may require an excessively long amount of time to segment entity populations. As a result, delays in allocating resources may occur, resulting in reduced computing performance for a computing system, adverse effects on the overall user experience, and the like. Furthermore, existing population segmentation techniques may fail to accurately categorize entities into the correct populations, resulting in incorrect allocation of resources and poor computing system performance.

Thus, there is a need in the art for improved techniques of entity population segmentation.

BRIEF SUMMARY

Certain embodiments provide a method of segmenting entity populations. The method generally includes: generating, for a set of training entities using a classification machine learning model, outputs that indicate likelihoods of a particular event occurring with respect to the set of training entities, wherein each respective training entity of the set of training entities is associated with a respective label indicating whether the particular event occurred with respect to the respective training entity; generating, using a given machine learning model, one or more distribution thresholds based on: approximating a first distribution for the outputs generated by the classification machine learning model; approximating a second distribution for occurrences of the particular event with respect to the set of training entities; and generating a given distribution threshold based on minimizing a value for the given distribution threshold, wherein the value for the given distribution threshold is generated as a function of the first distribution, the second distribution, and a targeted rate of occurrence for the particular event with respect to entities having corresponding likelihoods of the particular event occurring that are below the given distribution threshold; generating, for a received entity using the classification machine learning model, a given output that indicates a likelihood of the particular event occurring with respect to the received entity; and performing a given intervention with respect to the received entity based on the likelihood for the received entity exceeding the given distribution threshold.

Other embodiments provide a method of segmenting entity populations. The method generally includes: generating, for each respective entity of a set of entities using a classification machine learning model, a respective output that indicates a likelihood of a particular event occurring with respect to the respective entity; generating, using a given machine learning model, one or more distribution thresholds based on: approximating a first distribution for the outputs generated by the classification machine learning model; approximating a second distribution for occurrences of the particular event based on occurrences of the particular event with respect to a training subset of the set of entities, wherein each respective training entity of the subset of training entities is associated with a respective label indicating whether the particular event occurred with respect to the respective training entity, wherein the second distribution is approximated based on outputs generated by the classification machine learning model with respect to each entity of the training set of entities; and generating a given distribution threshold based on minimizing a value for the given distribution threshold, wherein the value for the given distribution threshold is generated as a function of the first distribution, the second distribution, and a targeted rate of occurrence for the particular event with respect to entities having corresponding likelihoods of the particular event occurring that are below the given distribution threshold; performing a first intervention protocol with respect to entities having generated likelihoods of the particular event occurring that are below the given distribution threshold; and performing a second intervention protocol with respect to entities having generated likelihoods of the particular event occurring that are above the given distribution threshold.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
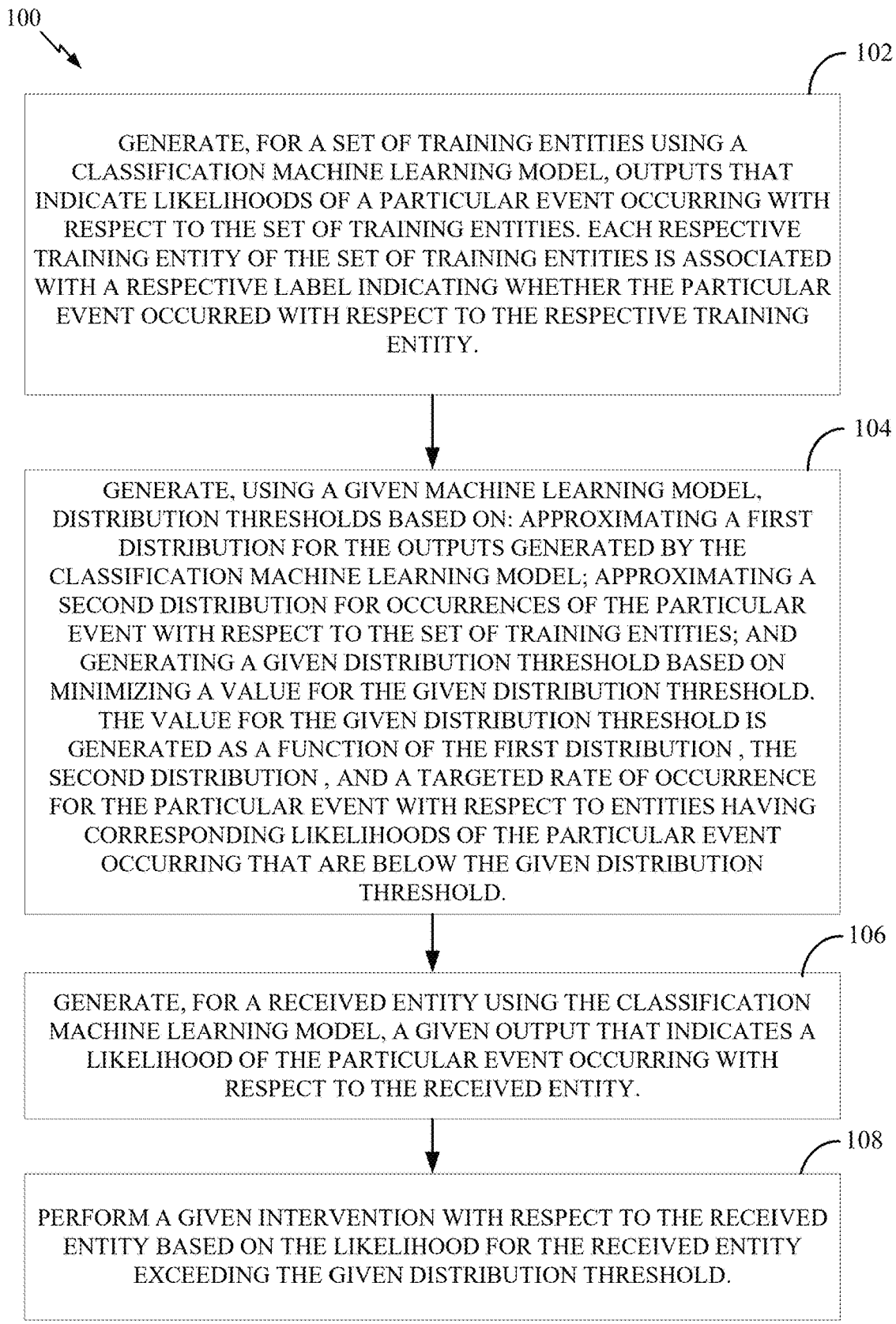
FIG. 1 depicts example operations related to segmenting entity populations.

Aspects of the present disclosure provide apparatuses, methods, processing systems, and computer-readable mediums for segmenting entity populations.

In many software applications and environments it is advantageous to segment entities such as computing system data, users, or devices into different subsets so that resources may be allocated to the entities in a targeted manner. For example, additional processing or communications resources may be allocated to a device based on the device being assigned to a segment of entities likely to experience a spike in latency, thereby avoiding performance degradation that would otherwise have occurred.

Accordingly, in some embodiments of the present disclosure, particular machine learning techniques may be used to segment entity populations based on the likelihood of occurrence for a particular event with respect to the entities. Entities may include data associated with a computing system, a device, a user profile for a user of a software application or service, and/or the like. For example, a first entity may include user profile features for a first user, and a second entity may include user profile features for a second user. The event may be any type of targeted event. For example, in the context of monitoring the performance of a computing system, the event may be a crash, error, or spike in latency. When entity populations are segmented according to techniques disclosed herein, different interventions may be implemented for each segment based on the likelihood of the event occurring. For example, a first segment may include entities for which a latency spike is relatively unlikely to occur, and a second segment may include entities for which latency spike is much more likely to occur. Entities in the second segment may thus be allocated more processor resources than entities in the first segment, which may in turn prevent latency and optimize the performance of the computing system. Also, fewer computing resources will be wasted in providing interventions for entities that do not require interventions.

In certain embodiments, during a training process, a classification machine learning model is used to score a set of training entities that are each associated with a label indicating whether or not the event occurred with respect to the training entity. Then, a machine learning model (e.g., a different model than the classification machine learning model) may be used to generate distribution thresholds for entities based on the scored and labeled training entities. Generating the distribution thresholds may involve approximating a distribution for the classification model outputs with respect to the training entities. Generating the distribution thresholds may also involve approximating a distribution for occurrences of the event with respect to the training entities (e.g., based on the labels). Then, each distribution threshold may be generated by minimizing the value of the distribution threshold as a function of the distributions and a targeted rate of occurrence for the event within a segment. The distribution thresholds learned during such a training process may be used for segmenting "new" entities (e.g., different than the training entities that were used to generate the distribution thresholds).

For example, "new" entities with classification model scores (e.g., scores output by the classification model) below a generated distribution threshold may be assigned to a first segment and "new" entities with classification model scores above a generated distribution threshold may be assigned to a second segment. Then, different intervention protocols may be performed with respect to each segment. For example, entities in the second segment may be allocated more processor resources than entities in the first segment.

Embodiments of the present disclosure provide numerous technical and practical effects and benefits. For example, by determining distribution thresholds for segmenting populations based on solving a sequence of constrained quadratic optimizations, embodiments disclosed herein allow for segmenting populations much more efficiently than existing techniques such as mixed integer programming (MIP) models. For example, embodiments disclosed herein may allow for segmenting entities exponentially faster than could be achieved using an MIP model. Additionally, the segmentation performed according to techniques described herein enables more accurate segmentation of entities than existing techniques. Furthermore, by allowing for quicker and more accurate segmentation of entity populations, embodiments of the present disclosure enable improvements in intervention allocation. For example, when computing tasks/constructs are accurately segmented based on likelihood of occurrence of an adverse event, resources used for preventing the event may be more optimally allocated within the computing system. Thus, the performance of the computing system and the overall user experience may be significantly improved. Also, by segmenting entities based on targeted rates of occurrence for each segment, embodiments of the present disclosure allow for a high degree of flexibility in determining population segments and allocating interventions.

Example Operations Related to Segmenting Entity Populations

FIG. 1 depicts example operations 100 related to segmenting entity populations. For example, operations 100 may be performed by one or more of the components described below with respect to FIG. 3, FIG. 4, and FIG. 5.

Operations 100 begin at step 102 with generating, for a set of training entities using a classification machine learning model, outputs that indicate likelihoods of a particular event occurring with respect to the set of training entities. Each respective training entity of the set of training entities is associated with a respective label indicating whether the particular event occurred with respect to the respective training entity.

Operations 100 continue at step 104 with generating, using a given machine learning model, distribution thresholds based on: approximating a first distribution for the outputs generated by the classification machine learning model; approximating a second distribution for occurrences of the particular event with respect to the set of training entities; and generating a given distribution threshold based on minimizing a value for the given distribution threshold. The value for the given distribution threshold may be generated as a function of the first distribution, the second distribution, and a targeted rate of occurrence for the particular event with respect to entities having corresponding likelihoods of the particular event occurring that are below the given distribution threshold. Some embodiments provide that generating the given distribution threshold is further based on the rate of occurrence of the particular event with respect to the entities having the corresponding likelihoods of the particular event occurring that are below the given distribution threshold being less than a recall rate of the classification machine learning model. Certain embodiments provide that generating the given distribution threshold is further based on a number of the entities having the corresponding likelihoods of the particular event occurring that are below the given distribution threshold being less than a number of entities having respective likelihoods of the particular event occurring that are above the given distribution threshold.

Operations 100 continue at step 106 with generating, for a received entity using the classification machine learning model, a given output that indicates a likelihood of the particular event occurring with respect to the received entity.

Operations 100 continue at step 108 with performing a given intervention with respect to the received entity based on the likelihood for the received entity exceeding the given distribution threshold.

According to some embodiments, operations 100 further include performing a second intervention with respect to entities having respective likelihoods of the particular event occurring that are below the given distribution threshold. In some embodiments, the given intervention comprises allocating more processor resources than are allocated in the second intervention.

In certain embodiments, operations 100 further include generating a particular distribution threshold that is higher than the given distribution threshold. The particular distribution threshold may be generated based on minimizing a value for the particular distribution threshold. The value for the particular distribution threshold may be generated as a function of the first distribution, the second distribution, and a targeted rate of occurrence for the particular event with respect to entities having respective likelihoods of the particular event occurring that are above the particular distribution threshold. According to some embodiments, a third intervention is performed with respect to entities having associated likelihoods of the particular event occurring that are above the particular distribution threshold.

Figure 2:
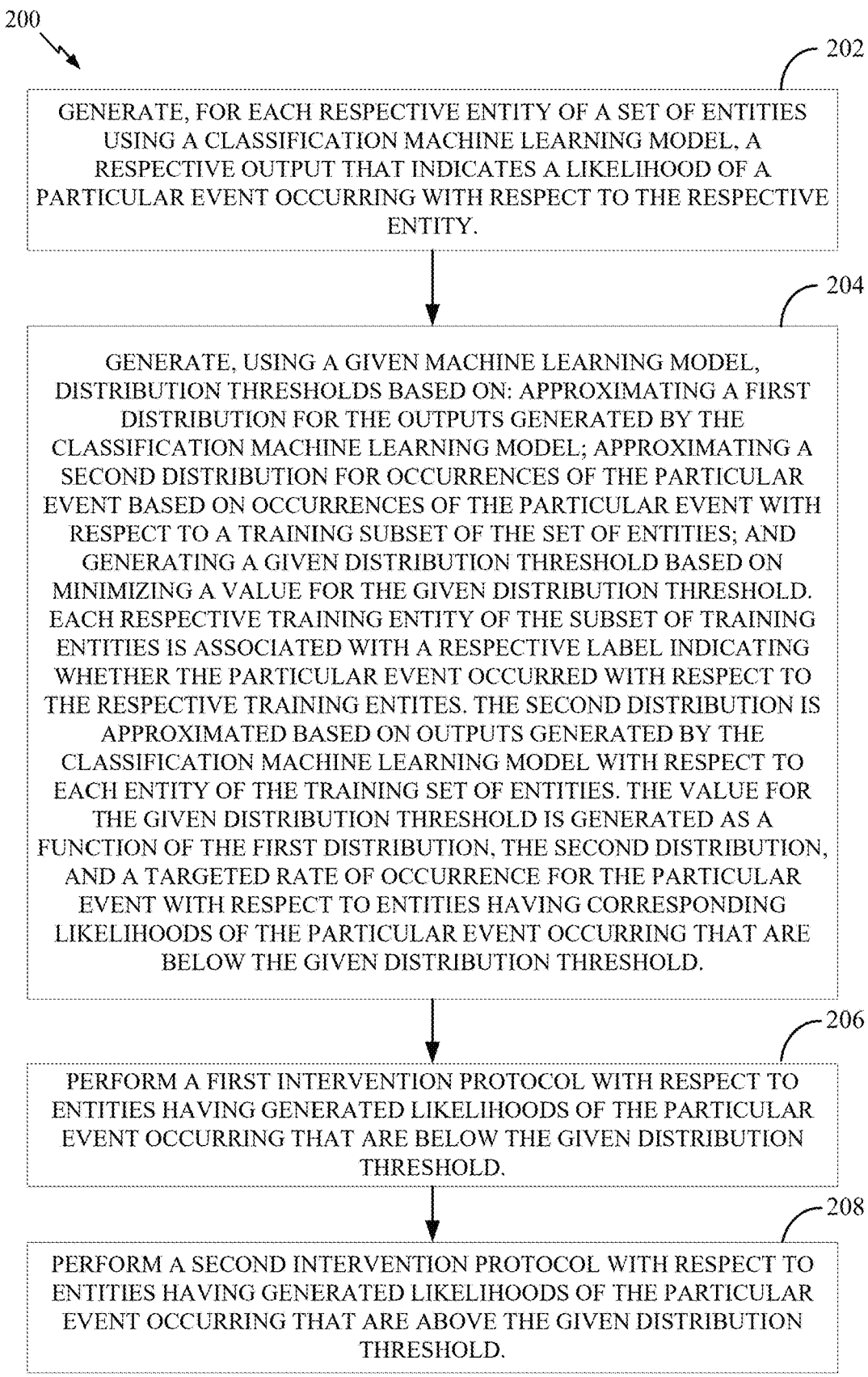
FIG. 2 depicts additional example operations related to segmenting entity populations.

FIG. 2 depicts example operations 200 related to segmenting entity populations. For example, operations 200 may be performed by one or more of the components described with respect to FIG. 3, FIG. 4, and FIG. 5.

Operations 200 begin at step 202 with generating, for each respective entity of a set of entities using a classification machine learning model, a respective output that indicates a likelihood of a particular event occurring with respect to the respective entity.

Operations 200 continue at step 204 with generating, using a given machine learning model, distribution thresholds based on: approximating a first distribution for the outputs generated by the classification machine learning model; approximating a second distribution for occurrences of the particular event based on occurrences of the particular event with respect to a training subset of the set of entities; and generating a given distribution threshold based on minimizing a value for the given distribution threshold. The value for the given distribution threshold may be generated as a function of the first distribution, the second distribution, and a targeted rate of occurrence for the particular event with respect to entities having corresponding likelihoods of the particular event occurring that are below the given distribution threshold. Each respective training entity of the subset of training entities may be associated with a respective label indicating whether the particular event occurred with respect to the respective training entity. The second distribution is approximated based on outputs generated by the classification machine learning model with respect to each entity of the training set of entities. Some embodiments provide that generating the given distribution threshold is further based on the rate of occurrence of the particular event with respect to entities having likelihoods below the given distribution threshold being less than a recall rate of the classification machine learning model. Certain embodiments provide that generating the given distribution threshold is further based on a number of entities having likelihoods below the given distribution threshold being less than a number of entities having likelihoods above the given distribution threshold.

Operations 200 continue at step 206 with performing a first intervention protocol with respect to entities having generated likelihoods of the particular event occurring that are below the given distribution threshold.

Operations 200 continue at step 208 with performing a second intervention protocol with respect to entities having generated likelihoods of the particular event occurring that are above the given distribution threshold. In some embodiments, the second intervention protocol comprises allocating more processor resources than are allocated in the first intervention protocol.

According to some embodiments, operations 200 further include generating a particular distribution threshold that is higher than the given distribution threshold. The particular distribution threshold may be generated based on minimizing a value for the particular distribution threshold, wherein the value for the particular distribution threshold is generated as a function of the first distribution, the second distribution, and a targeted rate of occurrence for the particular event with respect to entities having likelihoods that are above the particular distribution threshold. In some embodiments, a third intervention protocol is performed with respect to entities having likelihoods above the particular distribution threshold. According to certain embodiments, the second intervention protocol is performed with respect to entities having likelihoods below the particular distribution threshold and above the given distribution threshold.

Example of Computing Components Related to Segmenting Entity Populations

Figure 3:
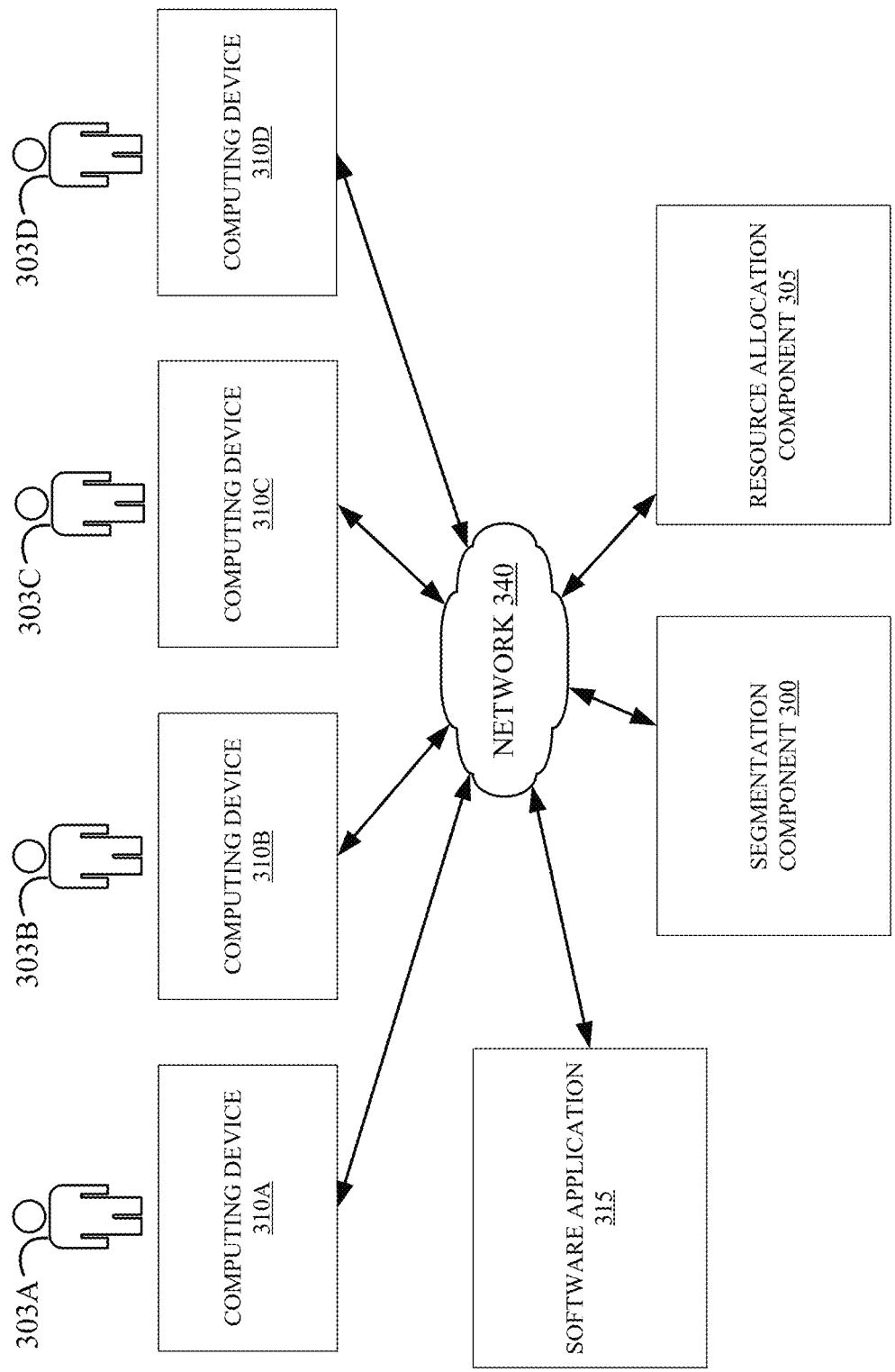
FIG. 3 depicts an example of computing components related to segmenting entity populations.

FIG. 3 depicts an example of computing components related to segmenting entity populations.

Users 303A-D may interact with a computing environment via user interfaces associated with computing devices 310A-D. The users 303A-D may perform actions via the computing devices 310A-D, such as using a software application 315, providing data, and/or the like. The computing devices 310A-D, the software application 315, a segmentation component 300, and/or a resource allocation component 305 may communicate over a network 340. Network 340 may be any connection over which data may be transmitted. In one example, network 340 is the Internet.

Data entities associated with the users 303A-D, computing devices 310A-D, software application 315, and/or network may be provided to segmentation component 300, which may segment the entities based on a targeted rate of occurrence for an event within each segment.

As an example, each entity may consist of performance data for a computing device 310 (e.g., a first entity may correspond to computing device 310A, a second entity may correspond to computing device 310B, and so on). The targeted event may be a spike in latency, a crash, and/or the like. Thus, segmentation component 300 may assign the computing devices to segments based on the likelihood of the latency spike, crash, etc. For example, if computing device 310A is significantly more likely to have a latency spike than computing device 310D, computing device 310A may be assigned to a first segment that corresponds to a high likelihood of latency while computing device 310D may be assigned to a second segment that corresponds to a low likelihood of latency. Then, resource allocation component 305 may be used to assign a large amount of processor resources to tasks being performed by the first segment. Fewer processor resources may be allocated to tasks performed by the second segment.

Similarly, the entities may represent different tasks performed by the software application 315, network 340, or another computing component. If a given task is highly likely to fail, crash, lag, and/or the like, the given task may be assigned to a segment that is allocated a higher amount of processor resources.

As another example, each entity may consist of user profile data for a user 303 (e.g., a first entity may correspond to a profile belonging to user 303A, a second entity may correspond to a profile belonging to user 303B, and so on). The targeted event may be a user 303 discontinuing use of the software application 315. Thus, segmentation component 300 may assign the user profiles to segments based on the likelihood that the corresponding user will discontinue use of the software application 315. For example, if user 303A is significantly more likely to discontinue use of the software application 315 than user 303D, the user profile for user 303A may be assigned to a first segment that corresponds to a high likelihood of discontinuance while the user profile for user 303D may be assigned to a second segment that corresponds to a low likelihood of discontinuance. Then, resource allocation component 305 may be used to assign a large amount of intervention resources to the first segment. Fewer intervention resources may be allocated to the second segment. The intervention resources in this example may, for example, comprise assistance prompts to guide users 303 in using the software application 315.

Figure 4:
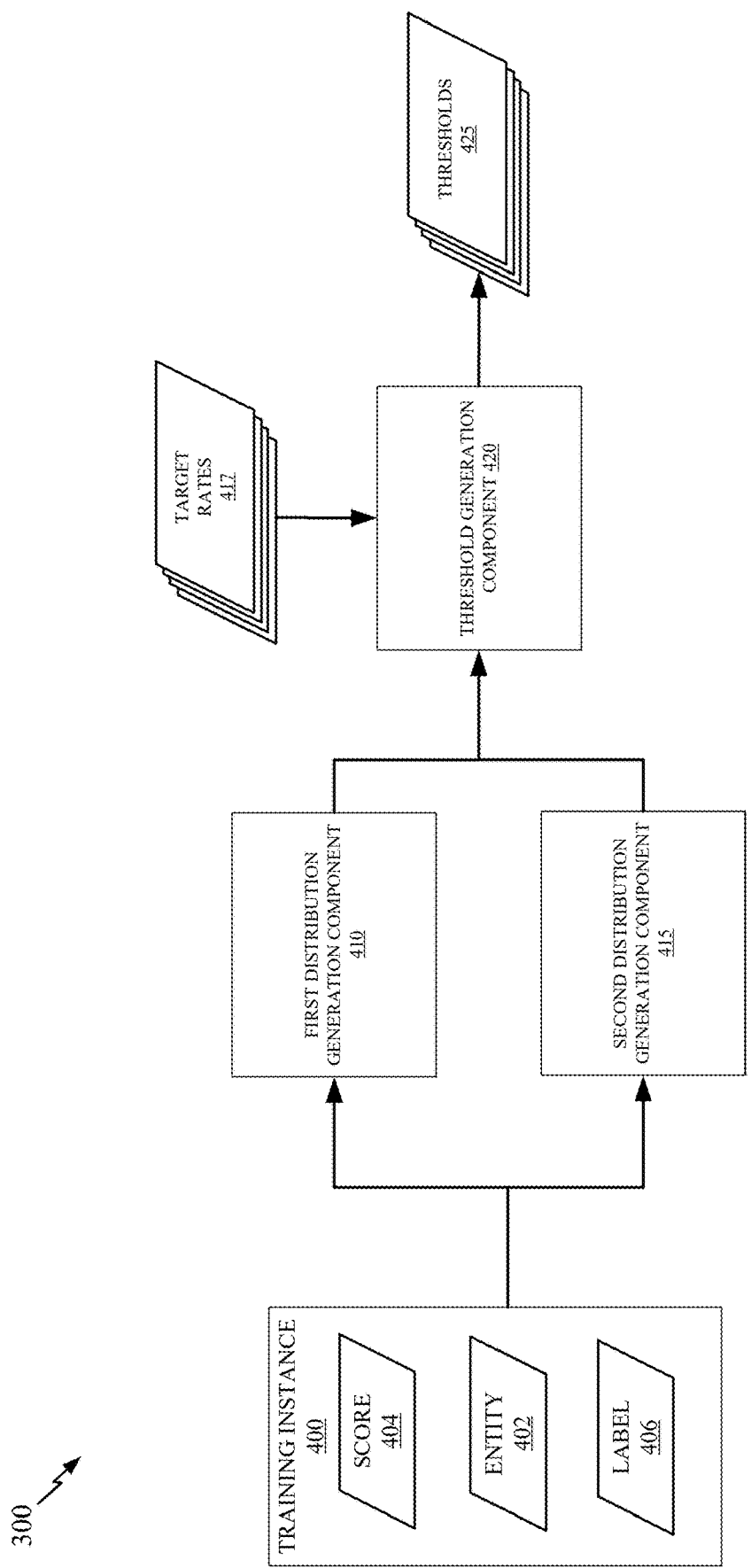
FIG. 4 depicts an additional example of computing components related to segmenting entity populations.

FIG. 4 depicts an additional example of computing components related to segmenting entity populations. In particular, FIG. 4 depicts functionality associated with segmentation component 300 of FIG. 3.

The segmentation component 300 comprises a machine learning model that is configured to generate thresholds 425 for segmenting entities. A training instance 400 may be used by segmentation component 300 to generate the thresholds 425. The training instance 400 may comprise an entity 402 (e.g., data associated with a computing device, user profile, and/or the like) as well as a score 404 for the entity 402 and a label 406 for the entity 402. The score 404 may be a classification machine learning model (e.g., a binary classifier) output that indicates the likelihood of a target event occurring with respect to the entity 402. The label 406 may be a ground truth label that indicates whether or not the target event actually occurred with respect to the entity 402. For example, the entity 402 may comprise performance data associated with a processor task at a given instance in time. The targeted event may be a latency spike. The score 404 may be a classification machine learning model output that indicates the likelihood of the latency spike occurring based on the performance data. The score 404 may, for example, be between "0" and "1," with scores closer to "0" indicating that the event is not likely to occur and scores closer to "1" indicating that the event is likely to occur. The label may indicate whether or not the latency spike actually occurred (e.g., a label of "0" may indicate non-occurrence and a label of "1" may indicate occurrence).

A first distribution generation component 410 may be implemented using one or more processors of a computing device. The first distribution generation component 410 may generate a first distribution based on a first distribution function for the training instance 400 and multiple other training instances (not shown). The first distribution function may approximate the distribution of classification machine learning model scores with respect to training entities. In some embodiments, the first distribution is also based on entities other than the training entities (e.g., newly received entities that will be segmented by the segmentation component 300).

According to some embodiments, the first distribution may be generated based on the following function:

$$\phi(z) \approx \frac{1}{N} \sum_i \mathbb{1}_{\{\hat{f}(x_i) \leq z\}},$$

where:
z represents the distribution threshold that is being generated;
N represents the total number of entities;
$x_i$ represents the $i^{th}$ entity; and
$\hat{f}(x_i)$ represents the classification machine learning model score for the $i^{th}$ entity $x_i$.

Thus, for each entity that has a classification machine learning model score lower than z, the sum of the first distribution function may be incremented.

In alternate embodiments, the first distribution may be generated based on the following function:

$$\varphi(z) \approx \Sigma_i \mathbb{1}_{\{\hat{f}(x_i) \leq z\}}.$$

A second distribution generation component 415 may be implemented using one or more processors of a computing device. The second distribution generation component 415 may generate a second distribution based on a second distribution function for the training instance 400 and multiple other training instances (not shown). The second distribution function may approximate the distribution of instances of occurrence of the particular event with respect to training entities.

Certain embodiments provide that the second distribution may be generated based on the following function:

$$\gamma(z) \approx \frac{1}{N} \sum_i \mathbb{1}_{\{y=1 \hat{f}(x_i) \leq z\}},$$

where:
z represents the distribution threshold that is being generated;
N represents the total number of entities;
$x_i$ represents the $i^{th}$ entity;
$\hat{f}(x_i)$ represents the classification machine learning model score for the $i^{th}$ entity $x_i$; and
y represents the label for the $i^{th}$ entity $x_i$, with y=1 indicating that the event occurred with respect to the entity and y=0 indicating that the event did not occur with respect to the entity.

Thus, for each training entity that has a classification machine learning model score lower than z and a label of "1," the sum of the first distribution function may be incremented.

In alternate embodiments, the second distribution may be generated based on the following function:

$$\gamma(z) = \Sigma_i \mathbb{1}_{(y=1, \hat{f}(x_i) \leq z)}.$$

The generated distributions may be used to generate the thresholds 425 by a threshold generation component 420. The threshold generation component 420 may be implemented using one or more processors of a computing device. The thresholds 425 may be generated based on target rates 417 provided by a user of the segmentation component 300. The target rates 417 may correspond to target rates of occurrence for the event with respect to the segments. For example, if the target rates 417 include a given rate for a given tier, a threshold may be generated such that entities with scores above (or, alternatively, below) the threshold are assigned to the given tier, which may result in the event occurring at the given rate for the given segment.

Each threshold may be generated by minimizing the following constrained root finding problem:

$$\theta_t^* = \operatorname{argmin}_{\theta_t} \left( \frac{\gamma(\theta_t) - \gamma(\theta_{t-1}^*)}{\phi(\theta_t) - \phi(\theta_{t-1}^*)} - r_t^{event} \right)^2$$

such that:

$$r_t^{recall} \leq \frac{\gamma(\theta_t) - \gamma(\theta_{t-1}^*)}{\gamma(\infty)},$$

where $\gamma(\infty)$ represents the proportion of occurrences of the event with respect to the total number of entities (e.g., if the event occurred for ten percent of the entities, $\gamma(\infty)$ would equal "0.1") and $r_t^{recall}$ represents the $r^{recall}$ rate for the classification machine learning model;
each threshold is greater than the previous threshold (i.e., such that $\theta_t$ is greater than $\theta_{t-1}$);
each segment is smaller than the previous segment (i.e., such that the segment with the lowest threshold contains the largest number of entities); and
each segment has a higher rate of occurrence for the targeted event ($r^{event}$) than the previous segment.

Alternate embodiments provide that the thresholds may be generated by minimizing the following constrained root finding problem:

$$\theta_t^* = \operatorname{argmin}_{\theta_t} \left| \left( \frac{\gamma(\theta_t) - \gamma(\theta_{t-1}^*)}{\phi(\theta_t) - \phi(\theta_{t-1}^*)} - r_t^{event} \right) \right|.$$

In the above root finding problems, $r^{event}$ represents the target rate of occurrence for the event within the given segment, $\theta_t$ represents the threshold for which entities with scores below et will be assigned to a given segment, and $\theta_{t-1}$ represents the threshold for which entities with scores above $\theta_{t-1}$ will be assigned to the given segment. The $\theta_{t-1}$ threshold for the first segment may be 0 (e.g., such that if an entity has a score of 0, the entity will be assigned to the first segment).

Using the generated thresholds, entities may be segmented by classification model scores into T tiers as follows:

$$\text{Segmentation Tiers} = \begin{cases} \hat{f}(x_i) \in [0, \theta_1^*) & \text{Tier1} \\ \hat{f}(x_i) \in [\theta_1^*, \theta_2^*) & \text{Tier2} \\ \vdots & \vdots \\ \hat{f}(x_i) \in [\theta_{T-1}^*, \theta_T^*) & \text{Tier}T \end{cases}$$

Figure 5:
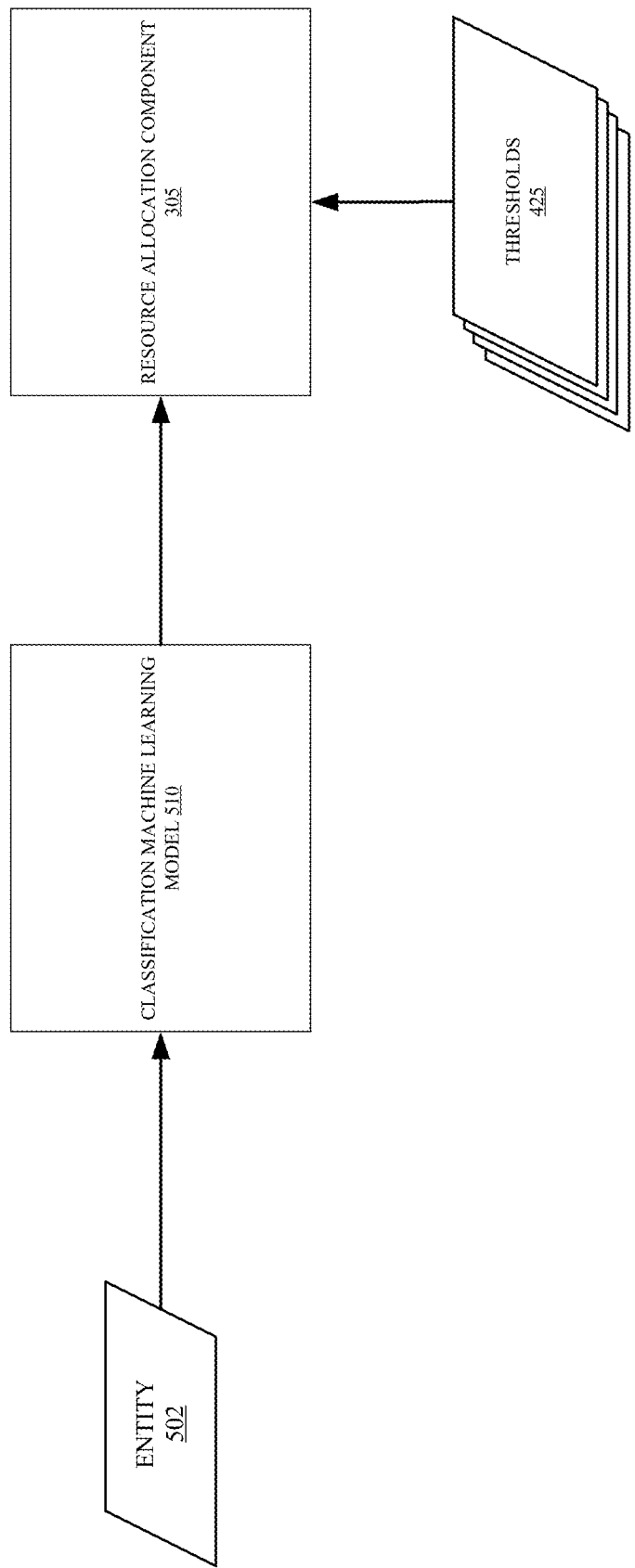
FIG. 5 depicts an additional example of computing components related to segmenting entity populations.

FIG. 5 depicts an additional example of computing components related to segmenting entity populations. In particular, FIG. 5 depicts functionality associated with resource allocation component 305 of FIG. 3.

An input based on an entity 502 is provided to a classification machine learning model 510. As discussed above, the entity 502 may include data associated with a computing system, network, computing device, software application, user profile, and/or the like. For example, the entity 502 may comprise performance data for a task in a software application. As another example, the entity 502 may comprise user profile data corresponding to a user profile.

The classification machine learning model 510 may generally comprise any type of machine learning model that is capable of generating an output that indicates the likelihood of an event occurring with respect to the entity 502. The classification machine learning model 510 may comprise a binary classifier model. In an example embodiment, the classification machine learning model 510 comprises a decoding-enhanced Bidirectional Encoder Representation from Transformer with disentangled attention (DeBERTa) model. In certain embodiments, the classification machine learning model 510 may comprise a tree-based machine learning model such as a gradient boosted tree, random forest, and/or the like. In some embodiments, the classification machine learning model 510 may comprise a Bayesian classifier, a regression model, a support vector machine, and/or the like. The classification machine learning model 510 may generate an output (e.g., a score) that indicates the likelihood of the targeted event occurring with respect to the entity 502. As an example, if the entity 502 represents performance data for a task in a software application, the event may be a crash or latency spike. If the entity 502 represents features of a user profile, the event may be the user discontinuing use of a software application. The output of the classification machine learning model 510 may comprise a number within a range of numbers that indicates the probability of the crash, latency spike, discontinuation, or another targeted event occurring. The score being near the maximum value of the range may indicate that the event is highly likely to occur, whereas the score being near the minimum value of the range may indicate that the event is highly unlikely to occur (or vice versa). For instance, if the range is from 0 to 1, a score near 0 may indicate that the event is unlikely to occur with respect to the entity, whereas a score near 1 may indicate that the event is likely to occur. A score of 0.5 may, in this example, indicate that the event is equally likely to either occur or not occur.

The classification machine learning model 510 (and/or any other model used in techniques described herein) may be trained based on supervised, unsupervised or semi-supervised learning techniques. Supervised learning techniques generally involve providing training inputs to a machine learning model. The machine learning model processes the training inputs and outputs predictions based on the training inputs. The predictions are compared to known labels associated with the training inputs to determine the accuracy of the machine learning model, and parameters of the machine learning model are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Model parameters adjusted during training may include, for example, hyperparameters, values related to numbers of iterations, weights, functions used by nodes to calculate scores, level of randomness, and/or the like. In some embodiments, validation and testing are also performed for a machine learning model (e.g., classification machine learning model 510, and/or any other model used in techniques described herein), such as based on validation data and test data, as is known in the art.

The output from the classification machine learning model 510 may be provided to resource allocation component 305. The resource allocation component 305 may compare the score indicated in the output to the thresholds 425 to assign the entity 502 to a segment. Based on the segment to which the entity 502 is assigned, intervention protocols may be performed with respect to the entity 502. For example, the entity 502 may be allocated more or fewer resources than other entities depending on the segment to which the entity 502 is assigned.

Example of a Segmented Population of Entities

Figure 6:
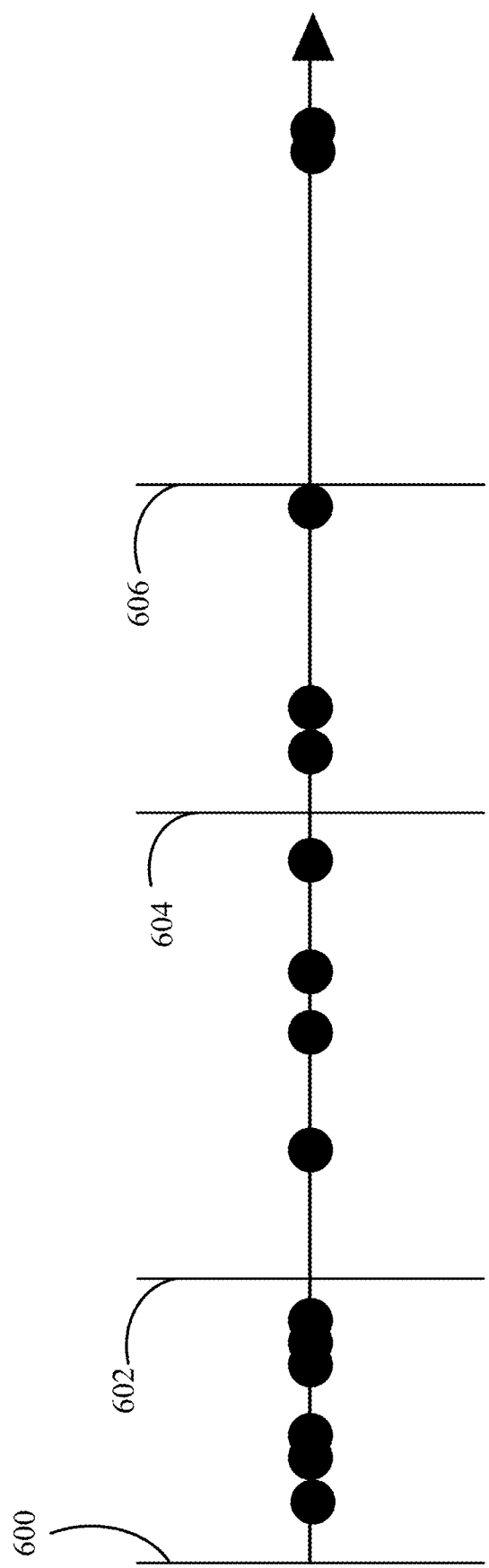
FIG. 6 depicts an example of a segmented population of entities according to embodiments of the present disclosure.

FIG. 6 depicts an example of a population of entities that is segmented according to embodiments of the present disclosure.

In FIG. 6, values for classification model scores with respect to a set of entities are shown along an X-axis. On the far left side of the axis, a first threshold 600 of zero is shown. A second threshold 602 generated by segmentation component 300 is shown to the right of the first threshold 600 along the X-axis. The second threshold 602 is a higher value than the first threshold 600, as represented by the position of the thresholds 600 and 602 along the X-axis. The six entities with scores below the second threshold 602 may be assigned to a first segment.

A third threshold 604 generated by segmentation component 300 is shown to the right of the second threshold 602 along the X-axis. The third threshold 604 is a higher value than the second threshold 602, as represented by the position of the thresholds 602 and 604 along the X-axis. The four entities with scores above the second threshold 602 and below the third threshold 604 may be assigned to a second segment.

A fourth threshold 606 generated by segmentation component 300 is shown to the right of the third threshold 604 along the X-axis. The fourth threshold 606 is a higher value than the third threshold 604, as represented by the position of the thresholds 604 and 606 along the X-axis. The three entities with scores above the third threshold 604 and below the fourth threshold 606 may be assigned to a third segment. The two entities with scores above the fourth threshold 606 may be assigned to a fourth segment.

Because the fourth segment represents entities for which the event is most likely to occur, entities in the fourth segment may be allocated more resources than entities in the other segments. Because the third segment represents entities for which the event is more likely to occur than for entities in the first two segments but less likely to occur than in the fourth segment, entities in the third segment may be allocated more resources than entities in the first two segments but fewer resources than entities in the fourth segment. Because the second segment represents entities for which the event is more likely to occur than for entities in the first segment but less likely to occur than in the third and fourth segments, entities in the second segment may be allocated more resources than entities in the first segment but fewer resources than entities in the third and fourth segments. Because the first segment represents entities for which the event is least likely to occur, entities in the first segment may be assigned the least amount of resources.

Example of a Processing System for Segmenting Entity Populations

Figure 7:
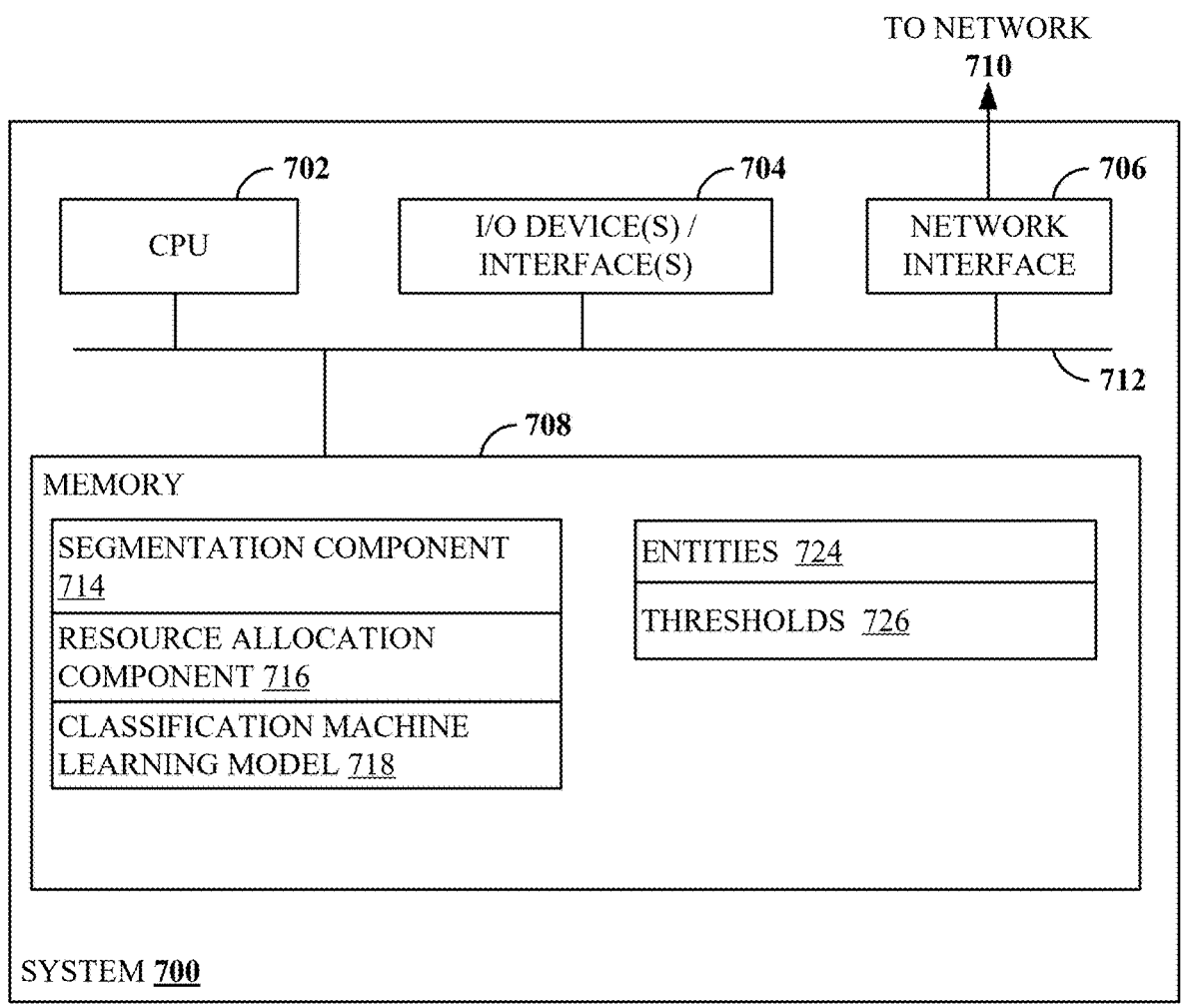
FIG. 7 depicts an example of a processing system for segmenting entity populations.

FIG. 7 illustrates an example system 700 with which embodiments of the present disclosure may be implemented. For example, system 700 may be configured to perform operations 100 of FIG. 1, operations 200 of FIG. 2, and/or to implement one or more components as in FIG. 3, FIG. 4, and FIG. 5.

System 700 includes a central processing unit (CPU) 702, one or more I/O device interfaces that may allow for the connection of various I/O devices 704 (e.g., keyboards, displays, mouse devices, pen input, etc.) to the system 700, network interface 706, a memory 708, and an interconnect 712. It is contemplated that one or more components of system 700 may be located remotely and accessed via a network 710. It is further contemplated that one or more components of system 700 may comprise physical components or virtualized components.

CPU 702 may retrieve and execute programming instructions stored in the memory 808. Similarly, the CPU 702 may retrieve and store application data residing in the memory 708. The interconnect 712 transmits programming instructions and application data, among the CPU 702, I/O device interface 704, network interface 706, and memory 708. CPU 702 is included to be representative of a single CPU, multiple CPUs, a single CPU having multiple processing cores, and other arrangements.

Additionally, the memory 708 is included to be representative of a random access memory or the like. In some embodiments, memory 708 may comprise a disk drive, solid state drive, or a collection of storage devices distributed across multiple storage systems. Although shown as a single unit, the memory 708 may be a combination of fixed and/or removable storage devices, such as fixed disc drives, removable memory cards or optical storage, network attached storage (NAS), or a storage area-network (SAN).

As shown, memory 708 includes segmentation component 714, resource allocation component 716, and classification machine learning model 718. In some embodiments, segmentation component 714 may be representative of segmentation component 300 of FIG. 3 or FIG. 4. Resource allocation component 716 may be representative of resource allocation component 305 of FIG. 3 or FIG. 5. Classification machine learning model 718 may be classification machine learning model 510 of FIG. 5.

Memory 708 further comprises entities 724, which may correspond to entity 402 of FIG. 4, or entity 502 of FIG. 5. Memory 708 further comprises thresholds 726, which may correspond to thresholds 425 of FIG. 4 or FIG. 5.

It is noted that in some embodiments, system 700 may interact with one or more external components, such as via network 710, in order to retrieve data and/or perform operations.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine learning-based method, comprising:
generating, for a set of training entities using a classification machine learning model, outputs that indicate likelihoods of a particular event occurring with respect to the set of training entities, wherein each respective training entity of the set of training entities is associated with a respective label indicating whether the particular event occurred with respect to the respective training entity;
generating, using a given machine learning model, one or more distribution thresholds based on:
approximating a first distribution for the outputs generated by the classification machine learning model;
approximating a second distribution for occurrences of the particular event with respect to the set of training entities; and
generating a given distribution threshold based on minimizing a value for the given distribution threshold, wherein the value for the given distribution threshold is generated as a function of the first distribution, the second distribution, and a targeted rate of occurrence for the particular event with respect to entities having corresponding likelihoods of the particular event occurring that are below the given distribution threshold;
generating, for a received entity using the classification machine learning model, a given output that indicates a likelihood of the particular event occurring with respect to the received entity; and
performing a given intervention with respect to the received entity based on the likelihood for the received entity exceeding the given distribution threshold.

2. The method of claim 1, further comprising performing a second intervention with respect to entities having respective likelihoods of the particular event occurring that are below the given distribution threshold.

3. The method of claim 2, wherein the given intervention comprises allocating more processor resources than are allocated in the second intervention.

4. The method of claim 1, further comprising generating a particular distribution threshold that is higher than the given distribution threshold, wherein the particular distribution threshold is generated based on minimizing a value for the particular distribution threshold, wherein the value for the particular distribution threshold is generated as a function of the first distribution, the second distribution, and a targeted rate of occurrence for the particular event with respect to entities having respective likelihoods of the particular event occurring that are above the particular distribution threshold.

5. The method of claim 4, wherein a third intervention is performed with respect to entities having associated likelihoods of the particular event occurring that are above the particular distribution threshold.

6. The method of claim 1, wherein generating the given distribution threshold is further based on the rate of occurrence of the particular event with respect to the entities having the corresponding likelihoods of the particular event occurring that are below the given distribution threshold being less than a recall rate of the classification machine learning model.

7. The method of claim 1, wherein generating the given distribution threshold is further based on a number of the entities having the corresponding likelihoods of the particular event occurring that are below the given distribution threshold being less than a number of entities having respective likelihoods of the particular event occurring that are above the given distribution threshold.

8. A machine learning-based method, comprising:
generating, for each respective entity of a set of entities using a classification machine learning model, a respective output that indicates a likelihood of a particular event occurring with respect to the respective entity;
generating, using a given machine learning model, one or more distribution thresholds based on:
approximating a first distribution for the outputs generated by the classification machine learning model;
approximating a second distribution for occurrences of the particular event based on occurrences of the particular event with respect to a training subset of the set of entities, wherein each respective training entity of the subset of training entities is associated with a respective label indicating whether the particular event occurred with respect to the respective training entity, wherein the second distribution is approximated based on outputs generated by the classification machine learning model with respect to each entity of the training set of entities; and
generating a given distribution threshold based on minimizing a value for the given distribution threshold, wherein the value for the given distribution threshold is generated as a function of the first distribution, the second distribution, and a targeted rate of occurrence for the particular event with respect to entities having corresponding likelihoods of the particular event occurring that are below the given distribution threshold;
performing a first intervention protocol with respect to entities having generated likelihoods of the particular event occurring that are below the given distribution threshold; and
performing a second intervention protocol with respect to entities having generated likelihoods of the particular event occurring that are above the given distribution threshold.

9. The method of claim 8, further comprising generating a particular distribution threshold that is higher than the given distribution threshold, wherein the particular distribution threshold is generated based on minimizing a value for the particular distribution threshold, wherein the value for the particular distribution threshold is generated as a function of the first distribution, the second distribution, and a targeted rate of occurrence for the particular event with respect to entities having likelihoods that are above the particular distribution threshold.

10. The method of claim 9, further comprising performing a third intervention protocol with respect to entities having likelihoods above the particular distribution threshold.

11. The method of claim 9, wherein the second intervention protocol is performed with respect to entities having likelihoods below the particular distribution threshold and above the given distribution threshold.

12. The method of claim 8, wherein generating the given distribution threshold is further based on the rate of occurrence of the particular event with respect to entities having likelihoods below the given distribution threshold being less than a recall rate of the classification machine learning model.

13. The method of claim 8, wherein generating the given distribution threshold is further based on a number of entities having likelihoods below the given distribution threshold being less than a number of entities having likelihoods above the given distribution threshold.

14. The method of claim 8, wherein the second intervention protocol comprises allocating more processor resources than are allocated in the first intervention protocol.

15. A system, comprising:
one or more processors; and
a memory comprising instructions that, when executed by the one or more processors, cause the system to:
generate, for a set of training entities using a classification machine learning model, outputs that indicate likelihoods of a particular event occurring with respect to the set of training entities, wherein each respective training entity of the set of training entities is associated with a respective label indicating whether the particular event occurred with respect to the respective training entity;
generate, using a given machine learning model, one or more distribution thresholds based on:
approximating a first distribution for the outputs generated by the classification machine learning model;
approximating a second distribution for occurrences of the particular event with respect to the set of training entities; and
generating a given distribution threshold based on minimizing a value for the given distribution threshold, wherein the value for the given distribution threshold is generated as a function of the first distribution, the second distribution, and a targeted rate of occurrence for the particular event with respect to entities having corresponding likelihoods of the particular event occurring that are below the given distribution threshold;
generate, for a received entity using the classification machine learning model, a given output that indicates a likelihood of the particular event occurring with respect to the received entity; and
perform a given intervention with respect to the received entity based on the likelihood for the received entity exceeding the given distribution threshold.

16. The system of claim 15, wherein the instructions further cause the system to perform a second intervention with respect to entities having respective likelihoods of the particular event occurring that are below the given distribution threshold.

17. The system of claim 16, wherein the given intervention comprises allocating more processor resources than are allocated in the second intervention.

18. The system of claim 15, wherein the instructions further cause the system to generate a particular distribution threshold that is higher than the given distribution threshold, wherein the particular distribution threshold is generated based on minimizing a value for the particular distribution threshold, wherein the value for the particular distribution threshold is generated as a function of the first distribution, the second distribution, and a targeted rate of occurrence for the particular event with respect to entities having respective likelihoods of the particular event occurring that are above the particular distribution threshold.

19. The system of claim 18, wherein a third intervention is performed with respect to entities having associated likelihoods of the particular event occurring that are above the particular distribution threshold.

20. The system of claim 15, wherein generating the given distribution threshold is further based on the rate of occurrence of the particular event with respect to the entities having the corresponding likelihoods of the particular event occurring that are below the given distribution threshold being less than a recall rate of the classification machine learning model.

\* \* \* \* \*